United States Patent
Hofmann

(10) Patent No.: US 7,153,117 B2
(45) Date of Patent: Dec. 26, 2006

(54) DEVICE FOR PRODUCING TUBES PROVIDED WITH CROSS RIBS

(75) Inventor: Gunther Hofmann, Hassfurt (DE)

(73) Assignee: Unicor GmbH Rahn Plastmaschinen, Hassfurt (DE)

( * ) Notice: Subject to any disclaimer, the term of this patent is extended or adjusted under 35 U.S.C. 154(b) by 43 days.

(21) Appl. No.: 10/537,044

(22) PCT Filed: Nov. 26, 2003

(86) PCT No.: PCT/DE03/03906

§ 371 (c)(1),
(2), (4) Date: Jun. 1, 2005

(87) PCT Pub. No.: WO2004/052624

PCT Pub. Date: Jun. 24, 2004

(65) Prior Publication Data

US 2006/0051446 A1 Mar. 9, 2006

(30) Foreign Application Priority Data

Dec. 9, 2002 (DE) .......................... 202 19 027 U

(51) Int. Cl.
*B29C 47/90* (2006.01)
*B29C 47/94* (2006.01)

(52) U.S. Cl. .................. 425/107; 425/233; 425/326.1; 425/336; 425/369; 425/392; 425/396

(58) Field of Classification Search ................ 425/107, 425/233, 325, 326.1, 336, 369, 387.1, 388, 425/392, 396

See application file for complete search history.

(56) References Cited

U.S. PATENT DOCUMENTS

| 3,280,430 | A | * | 10/1966 | Antrobus ..................... 425/370 |
| 3,776,679 | A | * | 12/1973 | Hegler ........................ 425/396 |
| 4,439,130 | A | * | 3/1984 | Dickhut et al. ............. 425/388 |
| 6,206,670 | B1 | * | 3/2001 | Neubauer ................ 425/326.1 |
| 6,457,965 | B1 | | 10/2002 | Hegler |

FOREIGN PATENT DOCUMENTS

DE 19702645 C1 6/1998
DE 10257363 C1 10/2003
WO WO-01/58669 A1 8/2001

OTHER PUBLICATIONS

Festo MAS- . . . 0010NH—Deutsch "Fluidic Muscle Typ MAS- . . . ".

* cited by examiner

*Primary Examiner*—Robert Davis
*Assistant Examiner*—Joseph Leyson
(74) *Attorney, Agent, or Firm*—Jan K. Simpson; Fulbright & Jaworski LLP

(57) ABSTRACT

Described is an apparatus for the production of transversely ribbed tubes, comprising mold jaw halves which are circulatingly moved in a condition of bearing against each other along two endless guide paths by means of a respective associated drive device, wherein the two guide paths have a common mold sections, a respective return section and two respective direction-changing sections. The respective direction-changing section has a direction-changing member provided with an arcuate guide edge. The guide paths along the common mold section and along the return sections have elongate wearing elements comprising a low-wear plastic material, which are exchangeably provided on a base arrangement of the apparatus.

8 Claims, 3 Drawing Sheets

US 7,153,117 B2

DEVICE FOR PRODUCING TUBES PROVIDED WITH CROSS RIBS

CROSS-REFERENCE TO RELATED APPLICATIONS

This application is a national stage filing of PCT/DE03/03906 filed Nov. 26, 2003 claiming priority to DE 20219027.7 filed Dec. 9, 2002.

TECHNICAL FIELD

The invention concerns an apparatus for the production of transversely ribbed tubes.

BACKGROUND OF THE INVENTION

DE 197 02 645 C1 discloses for example an apparatus for the production of transversely ribbed tubes, which along the common guide section for guiding the mold jaw halves has a linear guide device which is formed by an elongate central sliding body, preferably comprising a sliding metal alloy, and two oil-lubricated guide bodies which are disposed laterally beside the sliding body and which preferably comprise an abrasion wear-resistant metal.

U.S. Pat. No. 6,457,965 discloses an apparatus for the production of transversely ribbed tubes, comprising mold jaw halves which are circulatingly moved along two endless guide paths by means of a respective associated drive device. The mold jaw halves of the respective guide path are connected together by means of an endless chain. The two guide paths have a common mold section, a reactive return section and two respective direction-hanging sections. The mold jaw halves do not bear aft each other at the direction-changing sections. That known apparatus has a machine bed with a base plate of steel and with a support plate mounted thereon and comprising a sliding bearing metal, for example bronze.

Apparatuses of the general kind set forth as are known for example from the above-quoted publications with wearing members of metal suffer from the disadvantage that the wearing members are relatively cost-intensive. A further disadvantage is that replacement of the wearing members, as is often unavoidable after a long period of operation of the apparatus, is very time-consuming and consequently also cost-intensive. Often it is not possible at all for the user of such a known apparatus to perform the necessary replacement operation, which means that either the apparatus has to be sent back to the manufacturer thereof or that a fitter from the manufacturer of the apparatus has to be dispatched to the user of the apparatus. That all involves a considerable amount of complication and expenditure.

In consideration of those factors the object of the invention is to provide an apparatus of the kind set forth in the opening part of this specification, wherein the wearing members are comparatively inexpensive and replacement of the wearing members is possible quickly and in a timesaving fashion—including by the user of the apparatus on site—within a very short time.

BRIEF SUMMARY OF THE INVENTION

In accordance with the invention in an apparatus of the kind set forth in the opening part of this specification that object is attained by the features of the characterizing portion of claim 1.

The elongate wearing elements comprising the low-wear plastic material are provided on the base arrangement of the apparatus according to the invention in such a way that if necessary, that is to say after a long period of operation of the apparatus and corresponding deterioration, that is to say corresponding wear of the wearing members, the wearing elements can be exchanged in a time-saving and simple fashion and replaced by unused new plastic wearing members.

In order to ensure at any time during operation of the apparatus according to the invention that the wearing members reliably bear against the circulating mold jaw halves which bear against each other along the endless guide paths, the elongate wearing elements of low-wear plastic material are preferably resiliently provided on the base arrangement.

The elongate wearing elements preferably comprise a low-wear plastic material. It has proven to be particularly advantageous if a plastic material with oil inclusions is used for the wearing elements, because that minimizes the friction between the wearing elements and the mold jaw halves and consequently the productivity of the apparatus is correspondingly increased.

The elongate wearing elements are desirably provided with two longitudinal slots which are provided in laterally mutually spaced parallel relationship and which are provided in coincident relationship with a coolant feed and a coolant discharge for the mold jaw halves. The coolant feed and the coolant discharge of the respective mold jaw half are desirably of the configuration as described in DE 102 57 363 C1 which in that respect forms part of the disclosure of the present application.

It has proven to be advantageous if the direction-changing members provided between the common mold section and the two return sections comprise a low-wear plastic material which is preferably also a plastic material with oil inclusions.

Preferably the direction-changing members of the apparatus according to the invention are respectively connected to a compensation device by means of which a temperature- and/or speed-dependent tolerance play of the mold jaw halves circulating along the respectively associated guide path is compensated.

The apparatus according to the invention has the advantage that both the elongate wearing elements of the common mold section and of the two return sections and also the direction-hanging members at the direction-hanging sections are relatively inexpensively available and can be easily and quickly exchanged without any problem if required and replaced by unused new components.

BRIEF DESCRIPTION OF THE DRAWINGS

Further details, features and advantages will be apparent from the description hereinafter of an embodiment by way of example of the apparatus according to the invention and essential details thereof, as illustrated in the drawing in which.

DETAILED DESCRIPTION OF THE INVENTION

Figure 1:
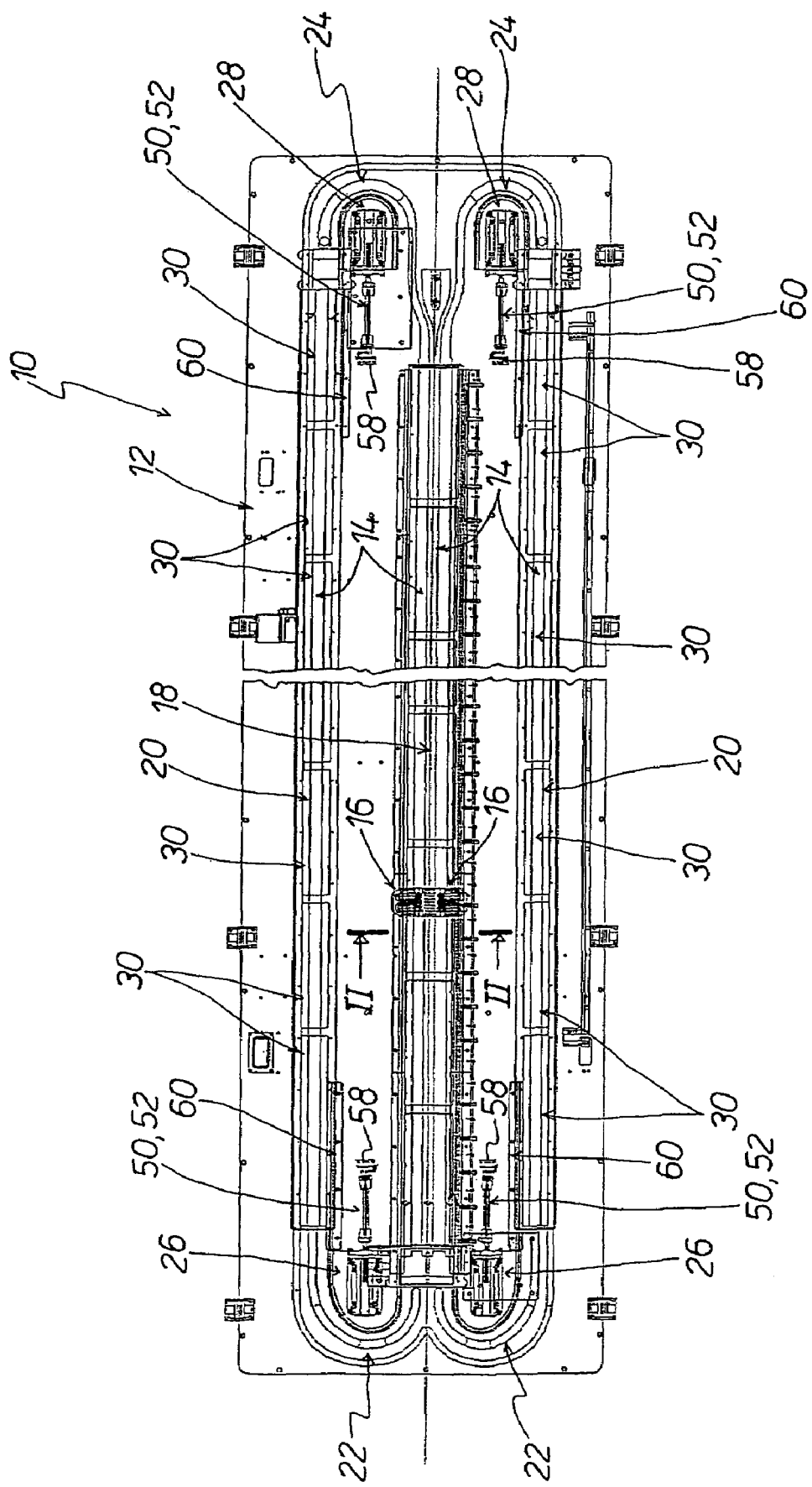
FIG. 1 is a cut-away plan view of an embodiment of the apparatus.

FIG. 1 is a cut-away view from above showing an apparatus 10 for the production of transversely ribbed tubes. The apparatus 10 has a base arrangement 12 with two endless guide paths 14 for mold jaw halves 16 of which only two mold jaw halves 16 are shown in FIG. 1. The two guide paths have a common mold section 18, a respective return section 20 extending parallel to the common mold section 18 and two respective direction-changing sections 22 and 24. Direction-changing members 26 are provided at the direction-changing sections 22 and direction-changing members 28 are provided at the direction-changing sections 24.

Elongate wearing elements 30 are provided along the common mold section 18 and along the return sections 20. The elongate wearing elements 30 are provided on the base arrangement 12 replaceably in a simple and time-saving manner. The elongate wearing elements 30 comprise a low-wear plastic material with oil inclusions.

Figure 2:
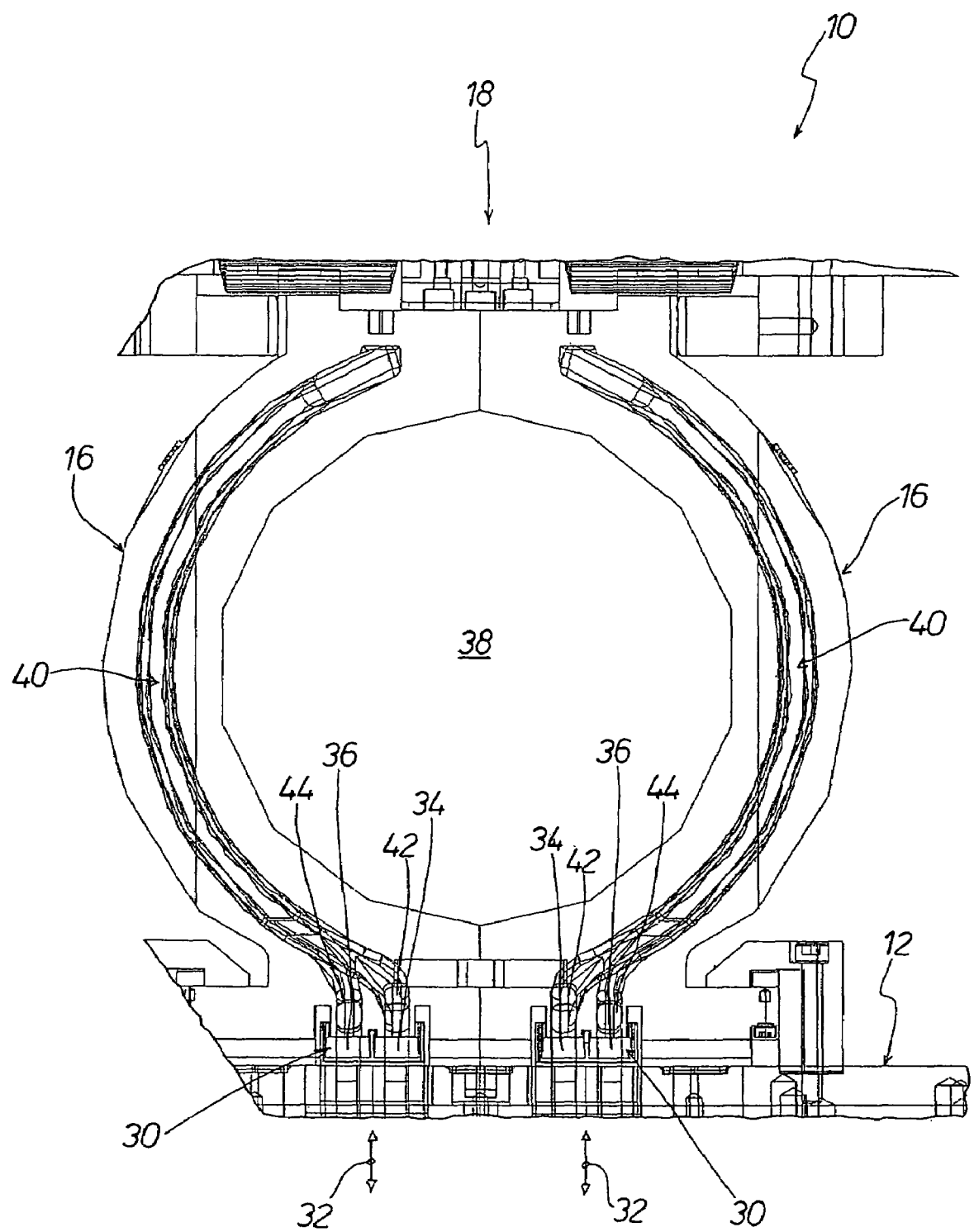
FIG. 2 shows a view of two mold jaw halves in the common mold section viewing in the direction of the arrows II—II in FIG. 1.

The elongate wearing elements 30 are provided resiliently on the base arrangement 12. This is diagrammatically indicated in FIG. 2 by the double-headed arrow 32. FIG. 2 also shows that the elongate wearing elements 30 are each provided with two longitudinal slots 34 and 36. The longitudinal slots 34 and 36 are spaced from each other and extend in mutually parallel relationship.

The mold jaw halves 16 which along the common mold section 18 form a guide passage 28 for the transversely ribbed tube to be produced are each provided with a cooling passage 40 with a coolant feed 42 and a coolant discharge 44. The respective coolant discharge feed 42 is provided in coincident relationship with the associated longitudinal slot 34. The respective coolant discharge 44 is provided in coincident relationship with the associated longitudinal slot 36. The coolant feed 42 and the coolant discharge 44 are preferably of such a configuration as is described in DE 102 57 363 C1.

The direction-changing members 26 and 28 which are provided between the common mold section 18 and the two return sections 20 and of which one is shown as a perspective view from below in FIG. 3 comprise a low-wear plastic material having oil inclusions. The respective direction-changing member 26, 28 is fixed releasably to a wearing element 46 which is linearly movably guidedly arranged on a base element 48. The base element 48 is provided in fixed relationship with the machine.

Figure 3:
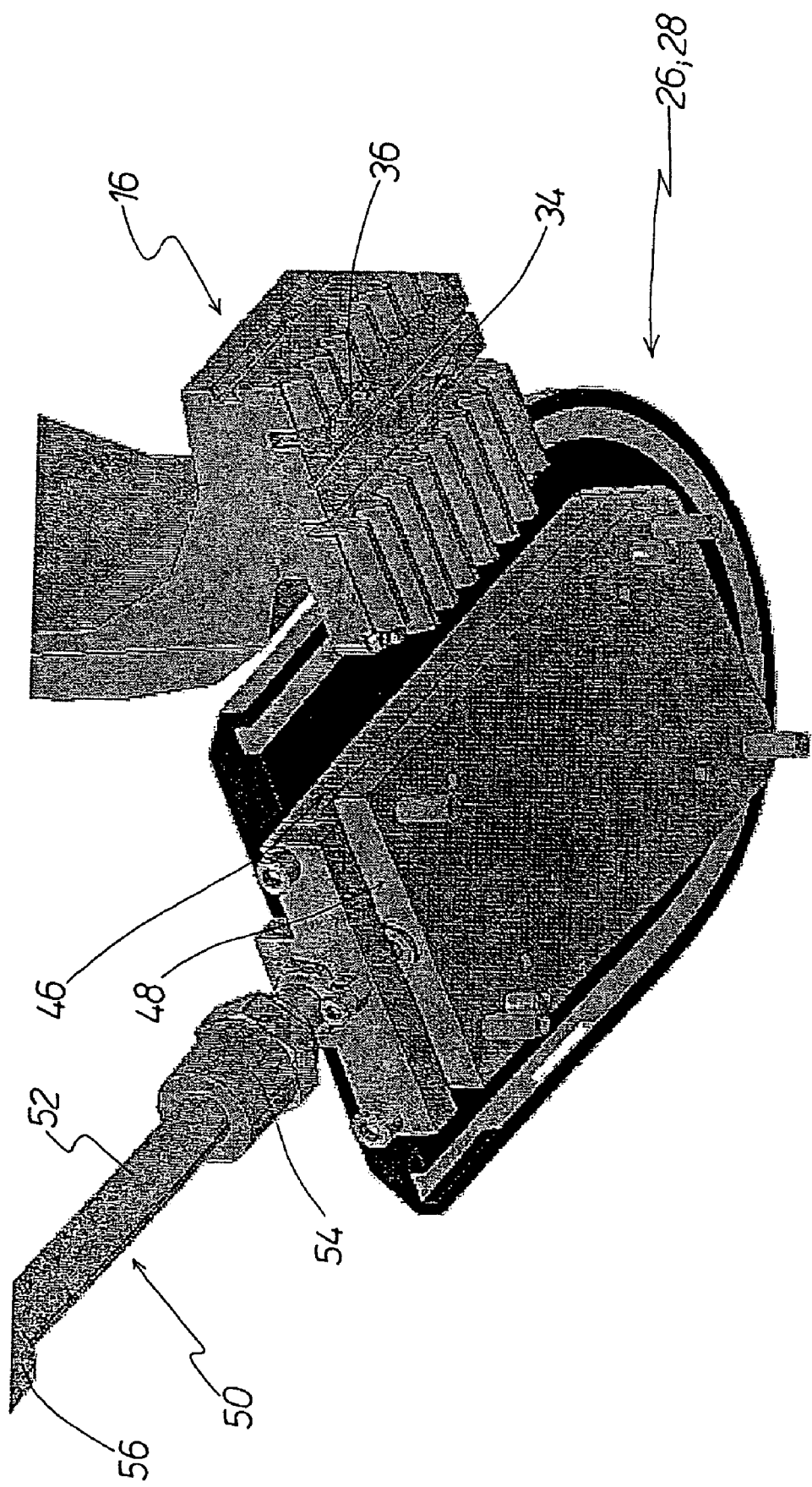
FIG. 3 shows a perspective view of a direction-changing section of the apparatus, with one mold jaw half being shown in cut-away forms

Connected to the displacement element 46 is a compensation device 50 which is described in the form of an air spring 52 (see FIGS. 1 and 3). Such a compensation device or air spring is described for example in the prospectus from Festo 'Fluidic Muscle Type MAS'. The air spring 52 has two connection fittings 54 and 56. The air spring 52 is connected to the displacement element 46 with the connection fitting 54. The connection fitting 56 is connected to a bracket 58 fixed with reset to the machine (see FIG. 1) and is provided with a compressed air connection.

The compensation devices 50 with the air springs 52 serve to compensate for a temperature- and/or speed-dependent tolerance play of the mold jaw halves 16 which circulate along the associated guide path 14 in a condition of bearing against each other so that there is a smooth and jolt-free transition between the rectilinear return sections 20 and the direction-changing sections 22, 24 as well as between the direction-changing sections 22 and 24 and the common straight mold section 18. The apparatus 10 can consequently be operated at a correspondingly higher operating speed and a higher level of productivity.

In FIG. 1 further guide elements 60 are illustrated at the above-mentioned transitions, which guide elements 60—like the wearing elements 30 and the direction-changing members 26, 28—comprise a low-wear plastic material with oil inclusions and which can also be easily and quickly changed when required and replaced by new guide elements 60.

What is claimed is:

1. An apparatus for the production of transversely ribbed tubes, comprising:
   mold jaw halves which are circulatingly moved in a condition of bearing against each other along two endless guide paths by means of a respective associated drive device, wherein the two guide paths have a common mold section, a respective return section and two respective direction-changing sections, wherein the respective direction-changing section has a direction-changing member provided with an arcuate guide edge, wherein the guide paths have elongate wearing elements which are exchangeably provided on a base arrangement of the apparatus,
   wherein the guide paths along the common mold section and along the return sections have the elongate wearing elements which comprise a low-wear plastic material.

2. The apparatus as set forth in claim 1, wherein the elongate wearing elements are resiliently provided on the base arrangements.

3. The apparatus as set forth in claim 1, wherein the plastic material has oil inclusions.

4. The apparatus as set forth in claims 1, wherein the elongate wearing elements are provided with two longitudinal slots which are provided in laterally mutually spaced parallel relationship and which are provided in coincident relationship with a coolant feed and a coolant discharge for the mold jaw halves.

5. The apparatus as set forth in claim 1, wherein the direction-changing members provided between the common mold section and the two return sections comprise a low-wear plastic material.

6. The apparatus as set forth in claim 5, wherein the plastic material of the direction-changing material has oil inclusions.

7. The apparatus as set forth in claim 5, wherein the direction-changing members are respectively connected to a compensation device which compensates for a temperature tolerance play of the mold jaw halves circulating along the respectively associated guide path.

8. The apparatus as set forth in claim 5, wherein the direction-changing members are respectively connected to a compensation device which compensates for a speed-dependent tolerance play of the mold jaw halves circulating along the respectively associated guide path.

* * * * *